United States Patent [19]

Lee et al.

[11] Patent Number: 5,737,104
[45] Date of Patent: Apr. 7, 1998

[54] WAVELENGTH DIVISION MULTIPLEXER AND DEMULTIPLEXER

[75] Inventors: Ho-Shang Lee, El Sobrante; Gerry Pesavento, Kensington; David Polinsky, San Francisco, all of Calif.

[73] Assignee: Dicon Fiberoptics, Berkeley, Calif.

[21] Appl. No.: 574,263

[22] Filed: Dec. 18, 1995

[51] Int. Cl.$^6$ .................................................. H04J 14/02
[52] U.S. Cl. ............................ 359/124; 385/24; 385/33; 359/131
[58] Field of Search ..................... 359/124, 126, 359/129, 130, 131, 133, 634, 629, 638, 639, 115; 385/37, 39, 24, 33

[56] References Cited

U.S. PATENT DOCUMENTS

| | | | |
|---|---|---|---|
| 4,244,045 | 1/1981 | Nosu et al. | 359/129 |
| 4,482,994 | 11/1984 | Ishikawa | 359/129 |
| 5,005,935 | 4/1991 | Kunikane et al. | 359/129 |
| 5,457,760 | 10/1995 | Mizrahi | 385/37 |

OTHER PUBLICATIONS

"Multidielectric Filter Devices," *Wavelength Division Multiplexing*, Prentice Hall international Series in Optoelectronics, Jean–Pierre Laude, Chapter 6, pp. 31–36, 1993.

"Stable Ultra–Narrow Bandpass Filters," Mike Scobey and Paul Stupik, Optical Corporation of America, presented at SPIE's International Symposium Jul. 1994, San Dieago, California.

*Primary Examiner*—Kinfe-Michael Negash
*Attorney, Agent, or Firm*—Majestic, Parsons, Siebert & Hsue

[57] ABSTRACT

A demultiplexer employs collimators for directing light of different wavelengths towards a filter so that light of one wavelength may be passed while reflecting light of other wavelengths. Light of the wavelengths that are passed or reflected may again be directed towards the same or different filter for further demultiplexing. The filter used has a characteristic wavelength band that varies with the angle of incidence to the filter. The same types of filter may be used for multiplexing. An input beam is passed through a filter at an angle of incidence at which light of a different wavelength would be reflected. Thus two input beams carrying such two wavelengths are directed towards the same location of the filter on opposite sides of the filter so that the reflected light of one wavelength will emerge as one beam with light of the other wavelength that passes through the filter. The emerging beam is then collected to multiplex light of the two wavelengths. This process can be repeated to multiplex light of a plurality of wavelengths.

30 Claims, 8 Drawing Sheets

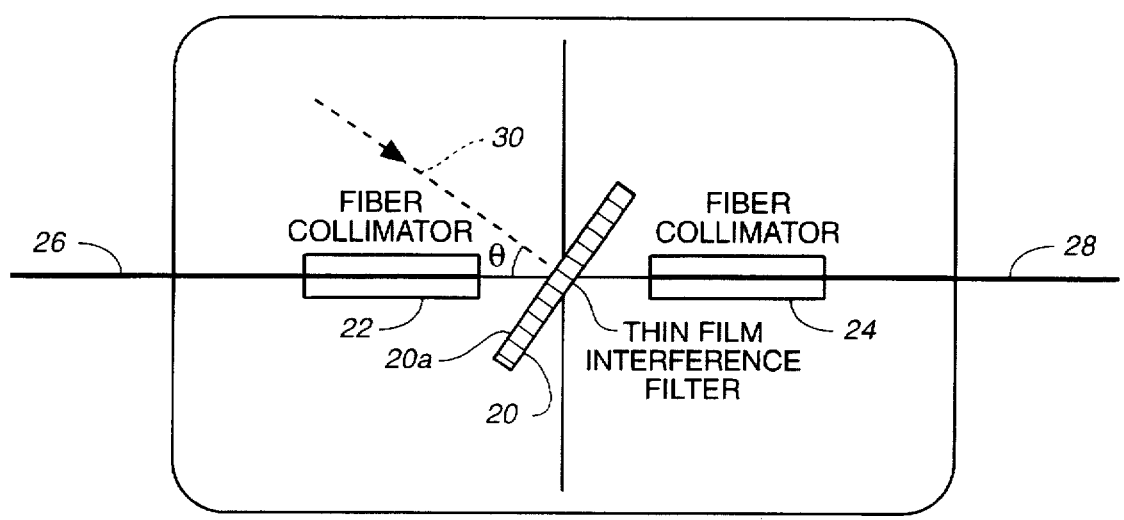
FIG._1

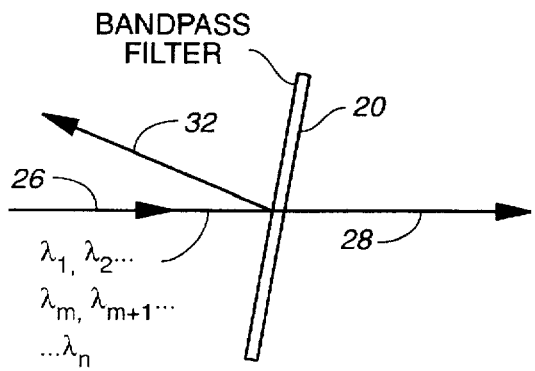
FIG._2A
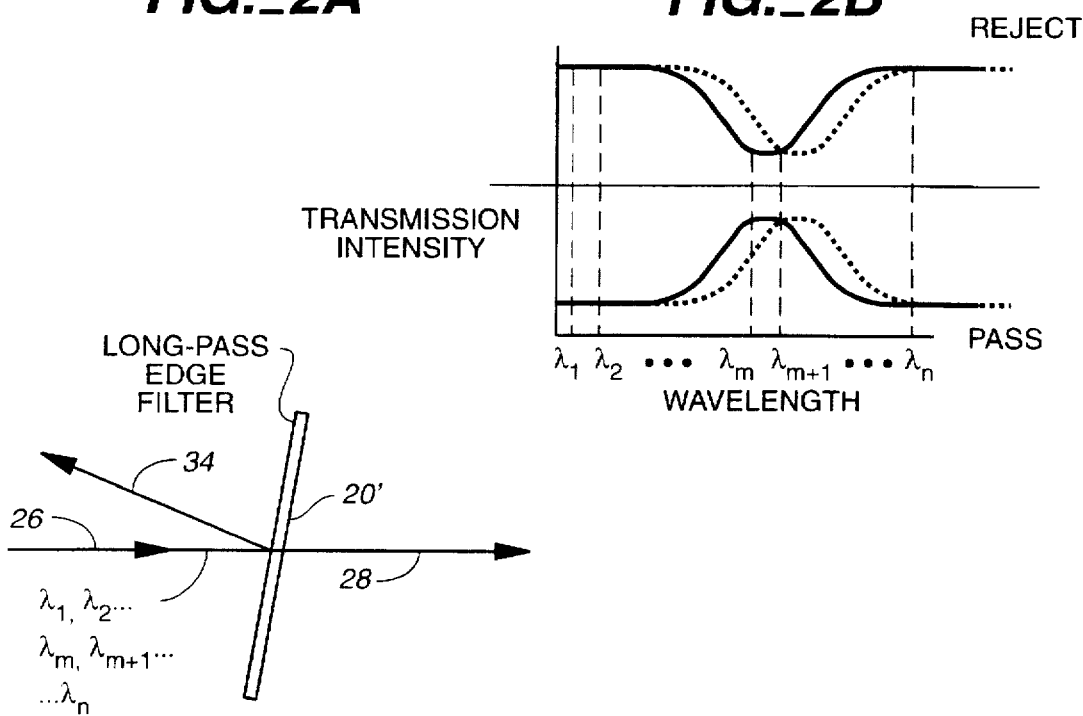
FIG._2B
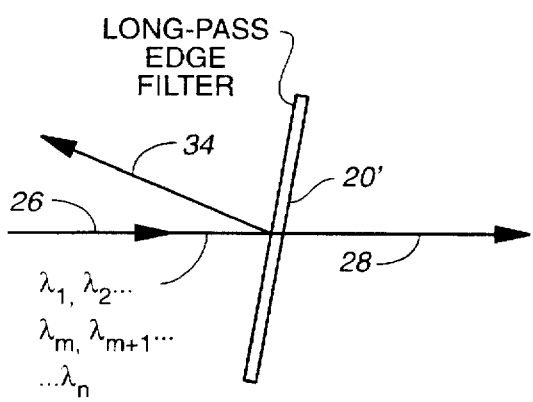
FIG._2C
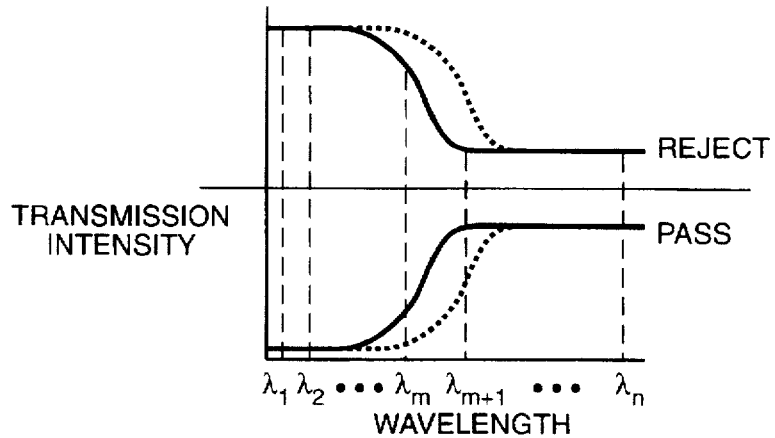
FIG._2D

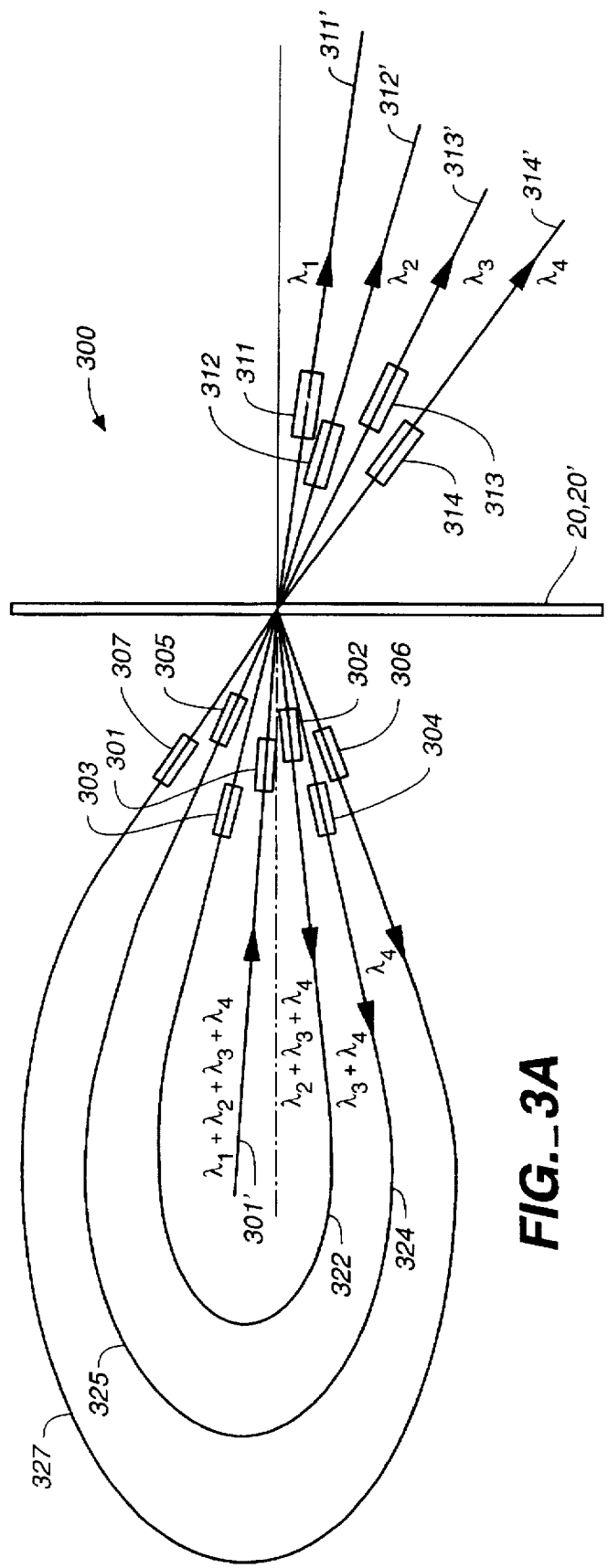
FIG._3A
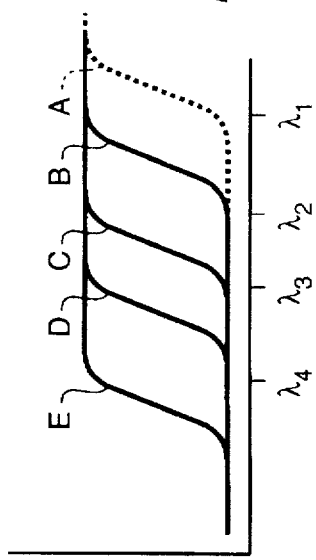
FIG._3B

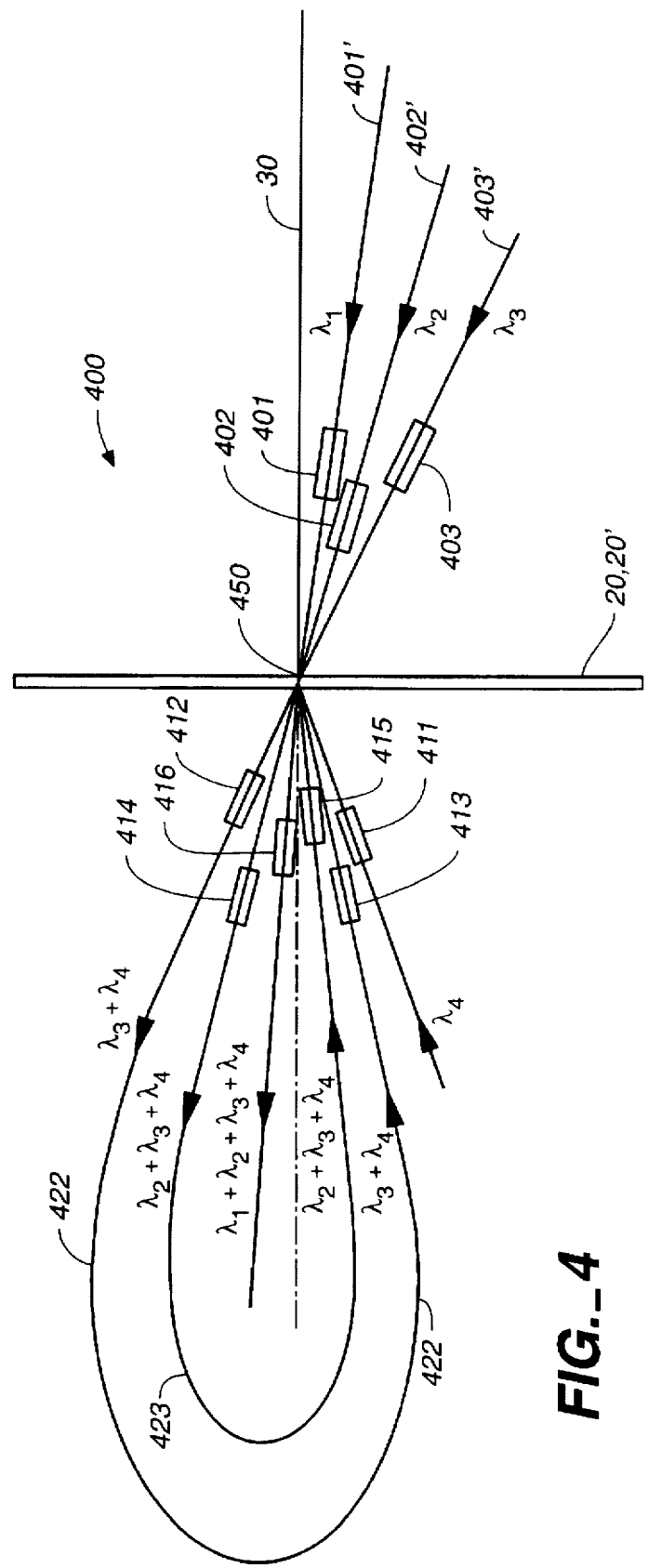
FIG._4

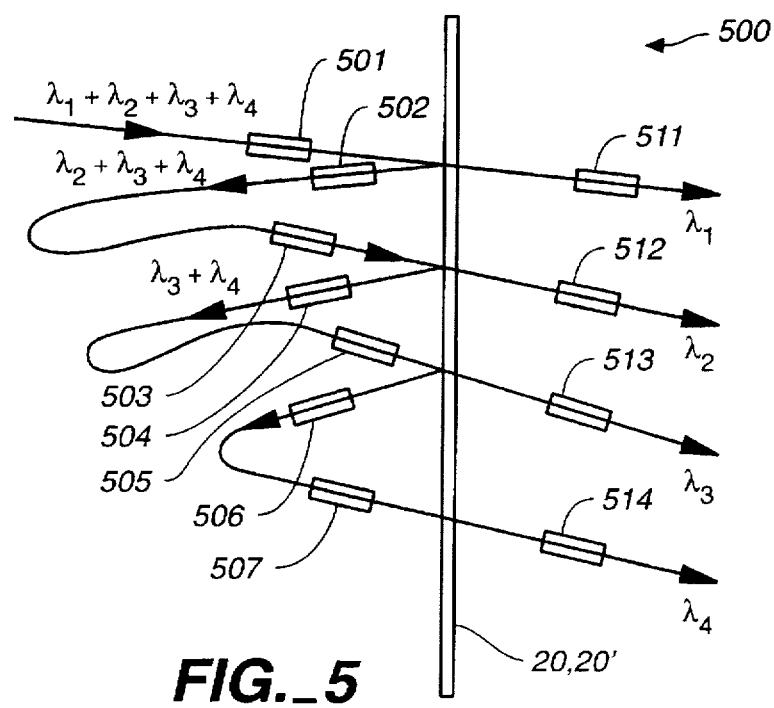
FIG._5
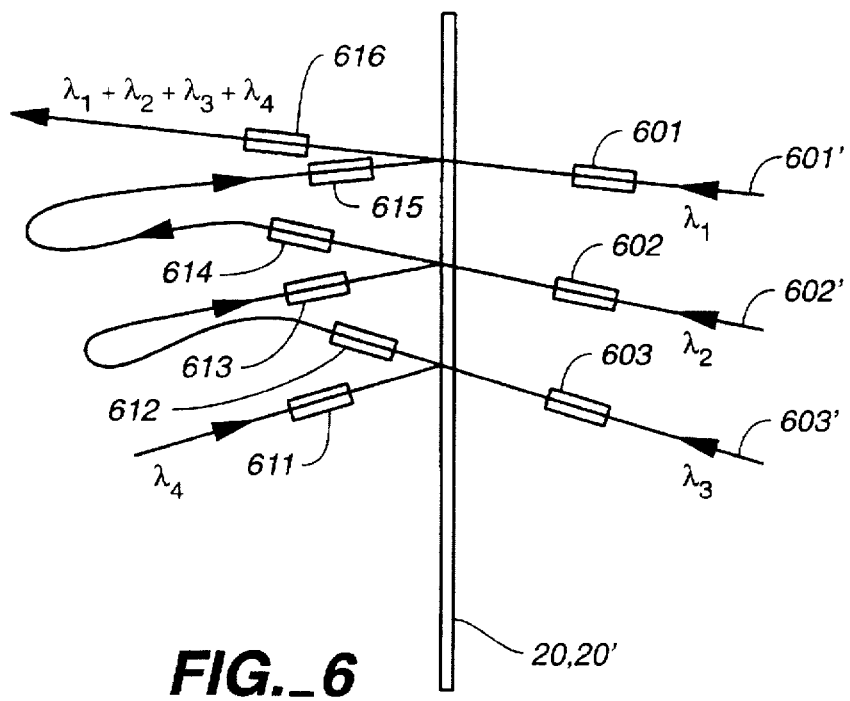
FIG._6

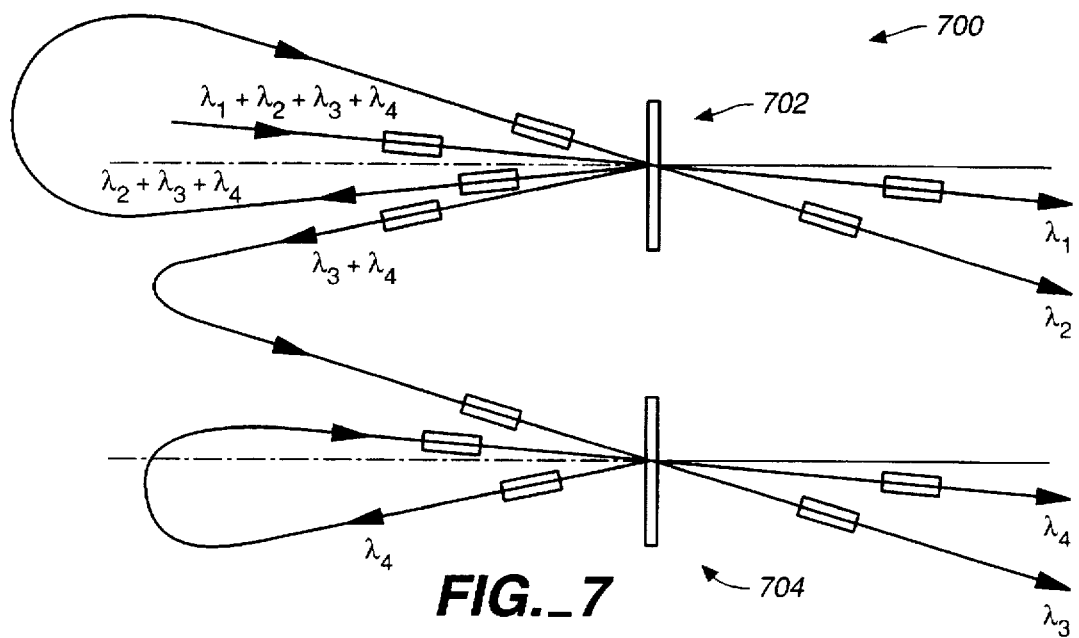
FIG._7
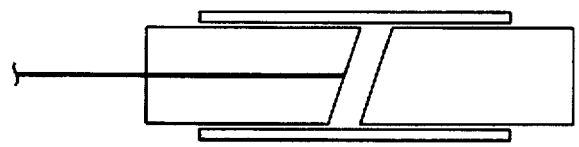
FIG._10A
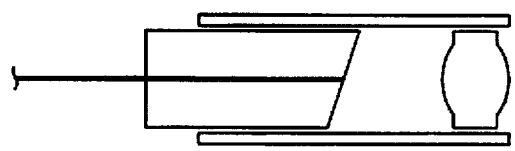
FIG._10B

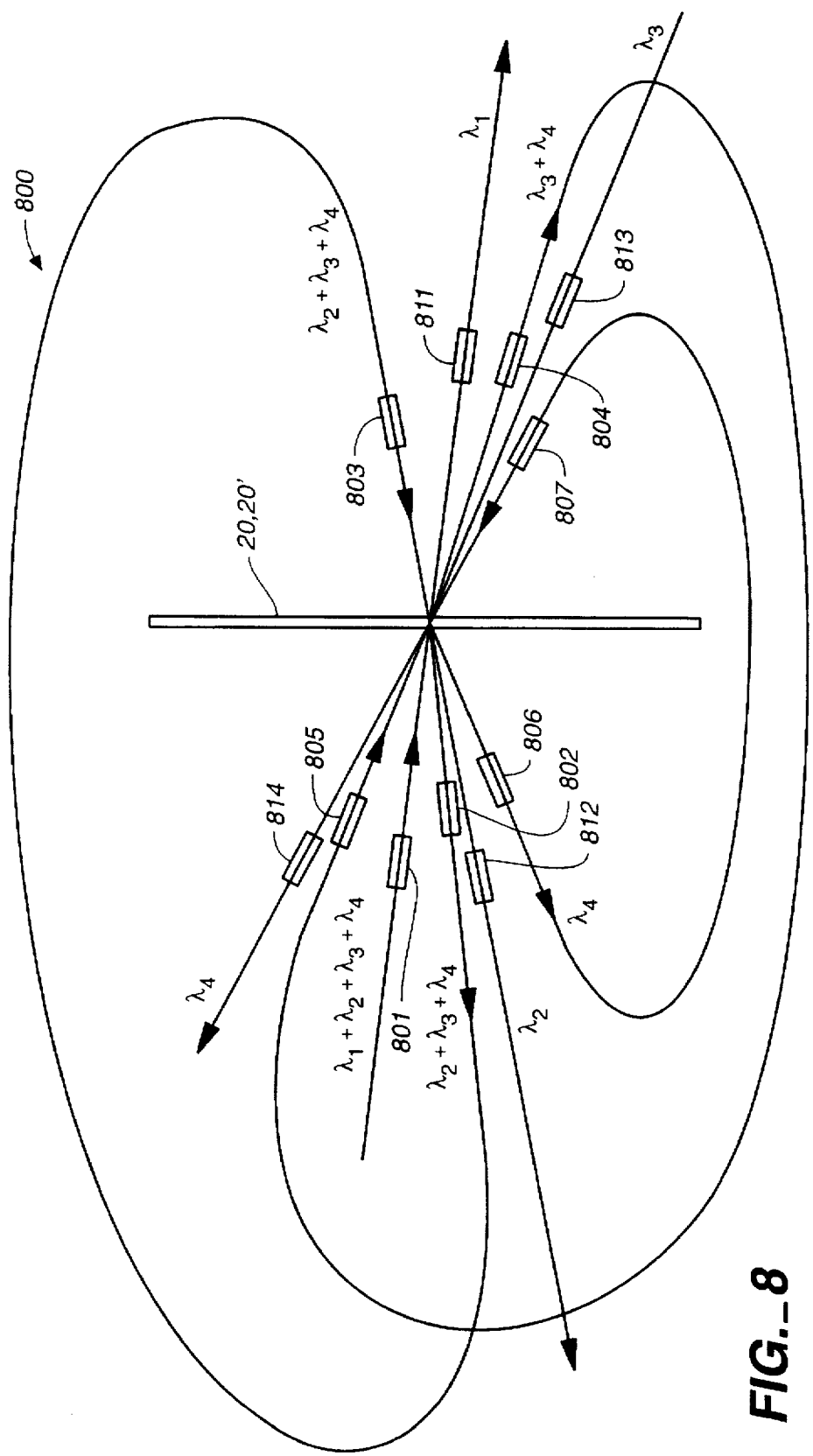
FIG._8

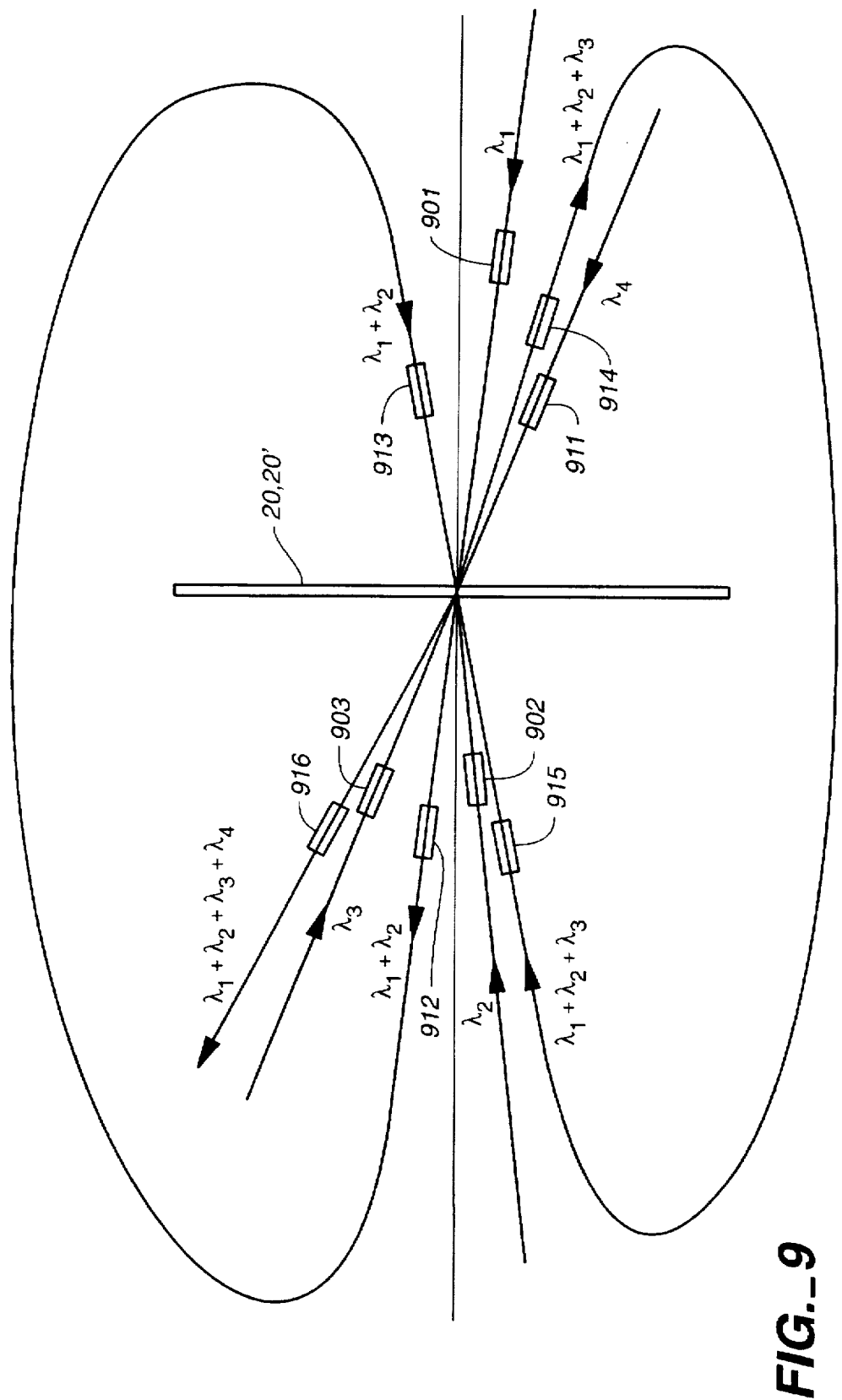
FIG._9

5,737,104

1

WAVELENGTH DIVISION MULTIPLEXER AND DEMULTIPLEXER

BACKGROUND OF THE INVENTION

This invention relates to wavelength division multiplexing and demultiplexing.

In recent years, optical fiber technology for telecommunication has progressed rapidly. While the theoretical transmission capacity of the single-mode optical fiber has been recognized in the industry as extremely high from the day such fiber was introduced, much of the capacity has not been utilized. For the increasing demand for bandwidth, such as in the transmission of video images and graphics, much attention has been directed lately toward the maximal utilization of the bandwidth of the single-mode fiber. The common schemes for increasing bandwidth utilization include time division multiplexing or wavelength division multiplexing while the time division multiplexing may be adequate for low bit rate services, wavelength division multiplexing is preferable for high bit rate functions, including high definition television broadcasting and video networks. In some cases, a combination of both techniques may be desirable.

In a WDM system, multiple signal sources emitting at different wavelengths, $\lambda_1, \lambda_2, \ldots, \lambda_n$, are coupled into the same single-mode fiber by means of a multiplexer. After the signals of different wavelengths are transmitted through the fiber to a desired destination, the multiple wavelength signals carried by the respective multiple wavelengths must then be separated by means of a demultiplexer into separate optical channels, each wavelength being carried by a different channel to a detector.

Conventional WDM multiplexers and demultiplexers employ thin film filters, diffraction gratings, wave guides, BRAGG in-fiber grading. A conventional WDM multiplexer and demultiplexer employs a number of filters, one filter adapted for passing one of the wavelengths. An example of such a multiplexer and demultiplexer is illustrated in the "Cascaded Four-channel Multiplexing and Demultiplexing Scheme" from Dicon Fiberoptics, Inc. of Berkeley, Calif., which is a two-page product brochure entitled "Filter WDM" from Dicon Fiberoptics, Inc. In such demultiplexing scheme, three filters are used for demultiplexing four wavelengths in a single channel. Each of the filters is used to pass one of the wavelengths and to reflect the remaining wavelengths. Such conventional scheme is disadvantageous since multiple filters are required as well as multiple optical paths between the filters so that the system is bulky and occupies much space.

Filters are made by the thin film deposition process. Practically, the center wavelength is very difficult to control in the deposition process. Therefore, the angle tuning is necessary for precisely selecting the center wavelength. The present requirement for multi/demultiplexer in the telecommuniation needs the center wavelength accuracy down to 0.1 nm or better. A prior art WDM device is disclosed in "Multidielectric Filter Devices," *Wavelength Division Multiplexing*, Prentice Hall International Series in Optoelectronics, Jean-Pierre Laude, Chapter 6, page 34, 1993. This device mounts individual filter elements in the glass block, is not practical for precise wavelength selection because no tuning flexibility is provided. The present invention can actively align the collimator at a precise angle with respect to the filter to achieve precise wavelength selection.

Another WDM scheme is disclosed in U.S. Pat. No. 5,457,760 issued to Mizrahi where an input waveguide is used where the waveguide includes a wavelength selective configuration of optical filtering elements formed within a contiguous portion of the waveguide forming an optical channel-selected filter having an optical transmission pass band and spectral regions of low transmissivity. Mizrahi indicated that exemplary optical filtering elements are BRAGG gratings formed into an optical fiber which transmits a characteristic wavelength band. The BRAGG gratings indicated by Mizrahi require that different wavelength grooves be formed in optical fibers, which appears to be difficult to do. Furthermore, Mizrahi's scheme requires that the light carried by an input channel to be demultiplexed be split into a number of output channels, thereby degrading signal-to-noise ratio.

None of the conventional or proposed WDM systems are entirely satisfactory. It is therefore desirable to provide an improved wavelength division multiplexing and demultiplexing scheme where the above-described difficulties are alleviated.

SUMMARY OF THE INVENTION

This invention is based on the observation that many filters have the characteristic property that the filter passes incident light of wavelengths within a characteristic wavelength band and reflect incident light of wavelengths outside the characteristic wavelength band, where the characteristic wavelength band varies with the angle of incidence of the incident light to the normal direction to the filter. The variation of the characteristic wavelength band with the angle of incidence is utilized for multiplexing and demultiplexing light of a plurality of wavelengths.

For each filter, a normal direction can be defined. In most instances, the filter comprises a multilayer coating with a substantially flat surface, so that a direction along the line normal to the flat surface of the filter pointing towards the filter can be defined as the normal direction of incidence of the filter, or simply the normal direction to the filter.

One aspect of the invention is directed towards a method for demultiplexing light of a plurality of wavelengths in an input beam by means of a filter having the characteristic property described above, said plurality of wavelengths including a first, second and a third wavelength. The method comprises (a) directing and collimating said input beam towards a filter with said characteristic property at a first incident angle so that light of one of the at least three wavelengths is reflected and light of another of the at least three wavelengths is passed by the filter; and (b) directing and collimating said light substantially reflected or passed by the filter towards the filter at a second incident angle different from the first incident angle, the first and second incident angles being such that the selective passage and reflection of light of different wavelengths by the filter separates the input beam into three output beams, each output beam containing light of one of the at least three wavelengths.

Another aspect of the invention is directed towards an apparatus for demultiplexing light of a plurality of wavelengths in an input beam containing light of a plurality of wavelengths including at least three wavelengths. The apparatus comprises a filter of the type described above, a first optical channel directing and collimating said input beam towards the filter at a first incident angle so that light of one of the at least three wavelengths is reflected and light of another of the at least three wavelengths is passed by the filter, and a second optical channel directing and collimating said light substantially reflected or passed by the filter towards the filter at a second incident angle different from the first incident angle. the first and second incident angles being such that the selective passage and reflection of light of different wavelengths by the filter separates the input beam into three output beams, each output beam containing light of one of the at least three wavelengths.

Another aspect of the invention is directed towards a method for multiplexing light of a plurality of wavelengths in different light beams into one output optical channel by means of a filter of the type described above. The method comprises (a) directing and collimating a light beam containing light of one of said plurality of wavelengths towards a location of a filter with said characteristic property from one side of the filter so that light of said one wavelength passes through the filter at an angle to the filter; (b) directing and collimating a light beam containing light of at least one additional wavelength of said plurality of wavelengths towards the location of the filter from the side of the filter opposite to said one side at substantially said angle to the filter so that light of the at least one additional wavelength is reflected by the filter at said location to emerge as one beam with or in close proximity to light of said one wavelength that has passed through the filter; and (c) collecting light of said one wavelength and said at least one additional wavelength into an output optical channel to form a collected beam.

One more aspect of the invention is directed towards an apparatus for multiplexing light of a plurality of wavelengths in different light beams into one output optical channel. The apparatus comprises a filter of the type described above; a first connecting optical channel directing and collimating a light beam containing light of one of said plurality of wavelengths towards a location of the filter from one side of the filter so that light of said one wavelength passes through the filter at an angle to the filter. The apparatus further comprises a second connecting optical channel directing and collimating a light beam containing light of at least one additional wavelength of said plurality of wavelengths towards the location of the filter from the side of the filter opposite to said one side at substantially said angle to the filter so that light of at least one additional wavelength is reflected by the filter at said first location to emerge as one beam with or in proximity to light of said one wavelength that has passed through the filter; and a first output optical channel collecting light of said one wavelength and said at least one additional wavelength to form a collected beam.

BRIEF DESCRIPTION OF THE DRAWINGS

FIG. 1 is a schematic view of a thin film interference filter, two fiber collimators, and two optical fibers for passing light through the filter useful for illustrating the invention.

FIG. 2A is a simplified schematic view of the apparatus of FIG. 1 where the interference filter is a bandpass filter.

FIG. 2B is a graphical illustration of the bandpass characteristics of the filter for the light that passes through the filter as well as that of the light rejected or reflected by the filter.

FIG. 2C is a simplified schematic view of the apparatus of FIG. 1 where the interference filter is a long-pass edge filter.

FIG. 2D is a graphical illustration of the characteristic property of the edge filter of FIG. 2C.

FIG. 3A is a schematic diagram of a WDM demultiplexer comprising a single filter and a number of collimators and optical fibers to illustrate the preferred embodiment of the invention.

FIG. 3B is a graphical illustration of the different characteristic wavelength bands of a long-pass edge filter at different angles of incidence to illustrate the embodiment of FIG. 3A.

FIG. 4 is a schematic view of a multiplexer comprising a filter, a plurality of fiber collimators and optical fibers to illustrate the preferred embodiment of the invention.

FIG. 5 is a schematic view of a demultiplexer to illustrate an alternative embodiment of the invention.

FIG. 6 is a schematic view of a multiplexer to illustrate an alternative embodiment of the invention.

FIG. 7 is a schematic view of a demultiplexer comprising two filters and a plurality of fiber collimators and optical fibers to illustrate another alternative embodiment of the invention.

FIG. 8 is a schematic view of a multiplexer with receiving channels on both sides of the filter element to illustrate another alternative embodiment of the invention.

FIG. 9 is a schematic view of a multiplexer with receiving channels on both sides of the filter element to illustrate another alternative embodiment of the invention.

FIGS. 10A, 10B are cross-sectional views of two fiberoptic collimators employing a GRIN lens and an aspheric lens respectively for use in this invention.

For simplicity in description, identical components are labeled by the same numerals in this application.

DETAILED DESCRIPTION OF THE PREFERRED EMBODIMENT

FIG. 1 is a schematic view of a filter having a characteristic property that the filter passes incident light of wavelengths within a characteristic wavelength band and reflect incident light of wavelengths outside the band. In the preferred embodiment, the filter may be a thin film interference filter. As shown in FIG. 1, filter 20 is placed between two fiber collimators 22, 24. Collimator 22 collimates an incoming beam carried by optical fiber 26 and collimator 24 collimates the light that has passed through filter 20 to output optical fiber 28. Filter 20 has a flat surface 20a so that a normal direction of incidence (or simply a normal direction) 30 may be defined for filter 20, where direction 30 is normal to surface 20a and pointing in the direction towards the filter.

As is known to those skilled in the art, many filters have the characteristic that their characteristic wavelength band varies with the angle of incidence of the incident light to the normal incidence direction of the filter. An interference type filter has such characteristic. For a detailed description of the characteristics of such interference filters, please see "Stable Ultra-Narrow Bandpass Filters," by Mike Scobey and Paul Stupik, presented at SPIE's International Symposium, July 1994, San Diego, Calif. Such property is illustrated in FIG. 1. Thus, if $\lambda_0$ is the center wavelength of light that is passed by filter 20 at zero angle of incidence (that is, when light is directed to the filter along direction 30), then the center frequency $\lambda_\theta$ of the characteristic wavelength band of incident light at angle of incidence $\theta$ is given by the following equation:

$$\lambda_\theta = \lambda_0(1 - a\sin^2\theta)^{1/2}$$

where a is the coefficient related to the effective refractive index of thin films in the thin film interference filter 20.

This invention is based on the observation that multiplexers and demultiplexers may be constructed using the above-described characteristic property of filters such as 20, where the characteristic wavelength band varies as a function of the angle of incidence. This is illustrated in FIGS. 2A–2D below.

Among many others, two possible types of interference filters may be used in the preferred embodiment of the invention. FIGS. 2A, 2B illustrate one of the two types, namely, the properties of a bandpass filter as used in this invention. FIG. 2A is a simplified schematic view of the optical arrangement in FIG. 1, where the input fiber 26 carries an input beam with light at wavelengths $\lambda_1, \lambda_2, \lambda_m, \lambda_{m+1}, \ldots, \lambda_n$. Filter 20 may be a bandpass filter having the characteristic property shown in FIG. 2B. As shown in FIG. 2B, light of wavelengths $\lambda_m$ and $\lambda_{m+1}$ are within the pass band while light of the remaining wavelengths in the input beam are in the rejection band. It should be noted in FIG. 2B that the transmission intensities of the passband and the rejection band are on different scales, so that the transmission intensity for the rejection band is not shown to be higher than that for the passband for the same wavelength. The same is true for FIG. 2D described below. Therefore, only light of wavelengths $\lambda_m, \lambda_{m+1}$ are passed by filter 20 and collimated by collimator 24 into output fiber 28, while light of the remaining wavelengths in the input beam are reflected by the filter as a reflected beam 32. Therefore, by collecting light of the remaining wavelengths in the input beam by means of another collimator and optical fiber, it is possible to demultiplex and separate light of wavelengths $\lambda_m, \lambda_{m+1}$ from the light of the remaining wavelengths in the input beam. Thus, if the input beam in input optical fiber 26 contains light of only two wavelengths (such as $\lambda_m$ and $\lambda_1$) where one wavelength $\lambda_m$ is in the pass band and the other $\lambda_1$ in the rejection band of filter 20, then light of wavelength $\lambda_m$ will pass through filter 20 and be collected by collimator 24 and output optical fiber 28, whereas light of wavelength $\lambda_1$ will be reflected by filter 20 along path 32 and be collected by another collimator and output optical fiber.

As will be illustrated below, if the input beam contains light of more than two wavelengths, and where it is desirable to separate light of each wavelength from light of all other wavelengths, light of wavelengths that have not been separated by the process described above will need to be again directed towards filter 20 or another filter with similar characteristic properties to again separate the light of different wavelengths.

FIG. 2C is a simplified schematic view of the arrangement of FIG. 1 where filter 20' employed is a long-pass edge filter with pass and rejection bands as illustrated in the graphical illustration of FIG. 2D. In the case of the edge filter 20', and as illustrated in FIG. 2D, light of wavelengths $\lambda_{m+1}, \ldots, \lambda_n$ are in the pass band while light of the remaining wavelengths in the input beam $\lambda_1$ through $\lambda_m$ are in the rejection band, so that only light in the pass band will pass through filter 20' and be collimated and collected by fiber 28 whereas light of the remaining wavelengths $\lambda_1$ through $\lambda_m$ are reflected by filter 20' and can be collected as a collected beam 34. As in the case of the bandpass filter 20 in FIGS. 2A, 2B, if the input beam contains only light of two wavelengths, and if one wavelength is in the pass band while the other wavelength is in the rejection band, then directing the input beam at filter 20' once is adequate to separate light of the two wavelengths into an output beam in output fiber 28 and the reflected beam 34. If the input beam contains light of more than two wavelengths, it will be necessary to direct light of different wavelengths that have not been separated by such process to filter 20' or a different filter as described below to further separate and demultiplex light of such wavelengths.

As shown in FIG. 2A, the angle of incidence of input beam 26 is at a non-zero angle to the normal direction 30. This means that the characteristic wavelength band of filter 20 has been shifted to the left relative to the characteristic wavelength band of filter 20 when the angle of incidence is zero; that is, the pass and rejection bands of filter 20 covers now a range of wavelengths that are shorter than those corresponding to a zero angle of incidence. In FIG. 2B, the pass and rejection bands at zero angle of incidence are shown in dotted lines, whereas the pass and rejection bands at the angle of incidence illustrated in FIG. 2A are shown in solid lines. From FIG. 2B, it will be apparent that what would be passed at normal angle of incidence would now be rejected and specularly reflected by the filter where the angle of incidence is not zero as illustrated in FIG. 2A. Therefore, by choosing the angle of incidence, it is possible to selectively pass light of one wavelength while selectively reflecting light of other wavelengths. The same is true for the long-pass edge filter 20' of FIGS. 2C, 2D.

FIG. 3A is a schematic diagram of a demultiplexer illustrating how an input beam containing light of four wavelengths is demultiplexed by means of a single filter having the characteristic properties of a characteristic wavelength band that varies with the angle of incidence in the manner described above. The filter may be a bandpass filter 20 or an edge filter 20' described above. As shown in FIG. 3, collimator and input fiber 301 carry an input beam containing light of four wavelengths: $\lambda_1$ through $\lambda_4$. The first incidence angle of input beam directed and collimated by collimator 301 and fiber 301' towards filter 20, 20' is selected so that light of wavelength $\lambda_1$ passes through the filter and light of the remaining wavelengths $\lambda_2$ through $\lambda_4$ is reflected by the filter in a specular reflection. The reflected light is collected by collimator 302 and connecting optical fiber 322 which conveys such light to a collimator 303 that collimates and directs such light towards the filter at the second incidence angle to the normal direction 30, the second incidence angle being different from the first incident angle of collimator 301. The second incidence angle is chosen so that light of wavelength $\lambda_2$ passes through the filter but light of the remaining wavelengths, namely, $\lambda_3$ and $\lambda_4$, are specularly reflected by the filter. Such reflected light is collected by collimator 304 and conveyed by connecting optical fiber 325 to another collimator 305 that directs and collimates such light towards the filter 20, 20' at a third incidence angle to the normal 30 different from the first and second incidence angles. The third angle of incidence is chosen so that the filter 20, 20' passes light of wavelength $\lambda_3$ but specularly reflects light of wavelength $\lambda_4$. Such specularly reflected light is collected by collimator 306 and conveyed by means of connecting optical fiber 327 to collimator 307 which directs such light towards the filter at a fourth angle of incidence different from the first, second and third angle of incidence. The fourth angle of incidence is chosen so that light of wavelength $\lambda_4$ will pass through the filter.

As also shown in FIG. 3A, since the light of the four wavelengths passes through the filter at different angles, light of each wavelength can be collected separately from light of other wavelengths. Thus, as shown in FIG. 3, light of wavelengths $\lambda_1, \lambda_2, \lambda_3, \lambda_4$ are collected respectively by collimators 311, 312, 313 and 314. Each of the collimators then collimates the light received into a corresponding output fiber so that light of the four wavelengths are now carried separately by the four optical fibers 311', 312', 313' and 314'. It is, of course, possible for the system 300 to separate light of more than one wavelength (i.e. $\lambda_1$) from light of other wavelengths (i.e. $\lambda_2, \lambda_3, \lambda_4$) at a time; all such variations are within the scope of the invention.

FIG. 3B illustrates how a long-pass edge filter may be used to demultiplex light of four wavelengths by choosing the appropriate angles of incidence. Thus as shown in FIG. 3B, the transmission intensity of the filter 20' as a function of wavelength is illustrated by curves A, B, C, D and E in FIG. 3B. If the incident light is at a zero angle of incidence (that is, at the normal direction of the filter), the transmitted intensity of the light is illustrated by curve A. From FIG. 3B, it will be seen that at such normal angle of incidence, light of all four wavelengths will be reflected. Collimator 301 directs and collimates the input beam containing light of four wavelengths at a first incidence angle where the intensity of transmission of filter 20' is now shifted to curve B. At such angle of incidence, only light of wavelength $\lambda_1$ will pass through the filter while light of the remaining three wavelengths $\lambda_2$ through $\lambda_4$ will be specularly reflected. Collimator 303 collimates and directs towards the filter light of the remaining three wavelengths at a second angle of incidence which is larger than the first incident angle, so that the characteristic wavelength band is now shifted to position C as shown in FIG. 3B, so that light at wavelength $\lambda_2$ will pass the filter while light of wavelengths $\lambda_3$, $\lambda_4$ will be specularly reflected. Collimator 305 collimates and directs light of such two wavelengths towards the filter at a third incident angle which is larger than the first and second angles of incidence, so that the characteristic wavelength band of filter 20' has now shifted to position D as shown in FIG. 3B. At such position, light of wavelength $\lambda_3$ will pass the filter while light of wavelength $\lambda_4$ would be specularly reflected. Lastly, collimator 307 collimates and directs light of wavelength $\lambda_4$ towards the filter at a fourth angle of incidence larger than the first three, so that the characteristic wavelength band of filter 20' has now shifted to position E shown in FIG. 3B. At such position, light of wavelength $\lambda_4$ will pass through the filter so as to accomplish the above-described demultiplexing function. If a bandpass filter 20 is used instead of a long-pass edge filter 20', the bandpass filter will operate in essentially the same way to separate light of the four wavelengths.

FIG. 4 is a schematic view of a multiplexer 400 to illustrate the preferred embodiment of the invention. As shown in FIG. 4, multiplexer 400 includes a filter 20, 20' which may be a bandpass or long-pass edge filter. The operation of multiplexer 400 will be illustrated in reference to both FIGS. 4 and 3B, where the filter is assumed to be a long-pass edge filter; it being understood that multiplexer 400 will operate in essentially the same way as described if a bandpass filter is used instead. Thus in reference to FIGS. 4 and 3B, collimator 403 collimates light of wavelength $\lambda_3$ carried by input fiber 403' and directs such light towards a location 450 of the filter at an angle of incidence characterized by curve D in FIG. 3B so that such light will pass through the filter. Collimator 411 collimates the light of wavelength $\lambda_4$ carried by fiber 411' towards the filter at an angle of incidence substantially equal to the angle of incidence of collimator 403 so that the characteristic wavelength band of the filter is at position D in FIG. 3B. This means that light of wavelength $\lambda_4$ would be specularly reflected at an angle substantially equal to the angle of incidence of collimator 411. If collimator 411 directs light of wavelength $\lambda_4$ at a location 450 of the filter that is the same as the location towards which collimator 403 directs light of wavelength $\lambda_3$ but on the opposite side of the filter, this means that light of wavelengths $\lambda_3$, $\lambda_4$ will emerge substantially as a single beam or as two beams that are in proximity to one another so that both beams can be collimated into one beam by means of collimator 412 as shown in FIG. 4.

Thus light of wavelengths $\lambda_3$, $\lambda_4$ have been multiplexed. Such multiplexed light is then conveyed by optical fiber 422 to a collimator 413. Collimator 402 collimates the input beam from fiber 402' of wavelength $\lambda_2$ and directs such light towards the filter at an angle of incidence so that the characteristic wavelength band of the filter is in position C, so that such light will be passed through the filter while light of wavelengths $\lambda_3$, $\lambda_4$ will be reflected. Collimator 413 collimates and directs light from fiber 422 towards the filter at an angle of incidence substantially equal to the angle of incidence of collimator 402 but on the opposite side of the filter so that such light will be specularly reflected by the filter to emerge as a single beam or closely contiguous beam with a beam of wavelength $\lambda_2$, so that the emerging one beam or two closely contiguous beams can be collimated by collimator 414 into a single beam of three wavelengths $\lambda_2$, $\lambda_3$ and $\lambda_4$.

Such emerging beam is then conveyed by a connecting optical fiber 423 to collimator 415. Collimator 401 collimates the input beam of wavelength $\lambda_1$ from input fiber 401' at an angle of incidence so that the characteristic wavelength band of the filter is in position B in FIG. 3B. At such position, the filter will pass light of wavelength $\lambda_1$ but specularly reflect light of wavelengths $\lambda_2$ through $\lambda_2$. Collimator 415 collimates and directs light of wavelength $\lambda_2$, $\lambda_3$, $\lambda_4$ at an angle of incidence to the filter substantially equal to the angle of incidence to collimator 401, so that such light will be specularly reflected to merge with light with wavelength $\lambda_1$ or a closely contiguous beams. Such emerging one beam or closely contiguous beams are then collimated by collimator 416 into a single beam which is conveyed by output fiber 425 as the output multiplexer 400.

In the demultiplexer 300 of FIG. 3A, all the collimators direct or receive light from a single location of the same filter. It will also be evident that, in order to demultiplex light containing N different wavelengths, it will be necessary to pass the light through the filter a total of N-1 times. Therefore, if the light to be multiplexed contains a large number of wavelengths which must all be separated out, it may be difficult to accommodate a large number of collimators in a small area. If one were to retain the same configuration as shown in FIG. 3A, this means that the large number of collimators can only be accommodated by increasing the distance between the collimators and the common spot or location of the filter towards which light is directed or received. This may increase optical losses due to increasing axial distance between the incident and receiving collimators. In such event, it may be desirable to use an alternative embodiment which is illustrated in FIG. 5. As shown in FIG. 5, the angles of incidence of collimators 501, 503, 505 and 507 are the same respectively as the angles of incidence of collimators 301, 303, 305 and 307 of FIG. 3A; the only difference being that these four collimators direct light towards different locations of the same filter instead of the same location as shown in FIG. 3A. Therefore, collimators 502, 504 and 506 and collimators 511, 512, 513 and 514 are also oriented at the proper locations so as to receive the transmitted or reflected beams from different locations of the filter 20, 20'. In this manner, the collimators 501 through 507 are spread out over a larger area so that all these collimators can still be maintained at short distances from the filter. The same is true for collimators 511 through 514. In this manner, optical loss can be reduced since the collimators are kept at close distances to the filter.

FIG. 6 is a schematic view of a multiplexer to illustrate an alternative embodiment to that of FIG. 4. As shown in FIG. 6, the collimators 601, 602, 603 collimate and direct light of respective wavelengths $\lambda_1$, $\lambda_2$, $\lambda_3$ at substantially the same angles as collimators 401, 402 and 403 in FIG. 4. Collimators 611, 613, 615 collimate and direct light from their respective fibers at angles of incidence essentially the same as collimators 411, 413 and 415 of FIG. 4. Collimators 612, 614 and 616 are placed in corresponding positions to collimate the emergent one beam or contiguous beams in the same manner as collimators 412, 414 and 416 of FIG. 4. Thus again, the difference between multiplexers 600 and 400 is only in that in multiplexer 600, the collimators do not direct and receive light from a single location of the filter as in multiplexer 400 so that the collimators can be spread out over a larger area. In this manner, the collimators can be kept close to the filter to reduce optical losses.

While in the embodiments described above, a single filter is used, it will be evident that different filters can be used in the above operation described will function in essentially the same manner to multiplex or demultiplex light of different wavelengths. This is illustrated by the demultiplexer 700 of FIG. 7. The characteristic wavelength band of filters 702, 704 at normal incidence may be the same. Where they have different characteristic wavelength bands at normal incidence, this may mean that even though light is directed at the two filters at the same angle of incidence, light of the same wavelength may be passed by one filter but reflected by the other. In other words, light of the same wavelength directed at the same angle of incidence to both filters may be passed by one filter but reflected by the other. Each filter element should be able to demultiplex light of at least two wavelengths, so that two filters may be used to demultiplex light of four wavelengths. Similarly, two or more filters may be used in the multiplexer.

In the embodiments of the demultiplexer described above, the collimators collimating and directing the input beam and the collimators collecting the reflected light to be further multiplexed and connected by connecting optical fibers are all located on the same side of the filter whereas the collimators and the optical fibers carrying the separated wavelength channels are located on the other side of the filters. This is not required for the operation of the invention. The invention will operate in essentially the same way even if not all the collimators carrying the input beam and light to be further demultiplexed are located on both sides of the filter, as illustrated by demultiplexer 800 of FIG. 8. In reference to FIGS. 3A, 8, collimators 801-807, 811-814 function in substantially the same way respectively as collimators 301 through 307, and 311 through 314. It will be noted that since optic fibers 811-814 can be located on both sides of the filter, collimator 806 may simply be treated as the output of the demultiplexer carrying light of wavelength $\lambda_4$ and collimators 807 and 814 can be eliminated.

FIG. 9 illustrates a multiplexer where input channels can be located on both sides of the filter. Again, collimators 901 through 904, and 911 through 916 perform substantially the same function as collimators 401 through 403 and 411 through 416 of FIG. 4, even though the order of multiplexing the wavelengths and the incident angles of the different wavelengths may not correspond exactly between the two figures. The only difference between multiplexers 400 and 900 lie in that in multiplexer 900, the input channels 901, 902, 903 are located on both sides of the filter whereas in multiplexer 400, the input channels 401, 402, 403 are located on the same side of the filter.

The construction of the fiberoptic collimators referred to above may preferably be as shown in FIG. 10A or FIG. 10B. FIG. 10A is a cross-sectional view of a fiberoptic collimator using a GRIN lens and FIG. 10B is a cross-sectional view of a fiberoptic collimator using an aspheric lens. Both types of collimators can be used for collimating and directing light in a manner described above.

While in the preferred embodiment, the angles of incidence are chosen so that only light of a single wavelength is passed through the filter at any one time, it will be understood that this is not required so that light of two or more wavelengths can be passed at any one time. The passed light can then be further redirected to the same or different filter for further demultiplexing or multiplexing. While in the embodiments described above, only the reflected light is further directed towards the same or a different filter for further demultiplexing or multiplexing, it will be understood that this is not required and that if light of two or more wavelengths are passed by the filter, such pass light can be re-directed towards the filter for further demultiplexing.

While the invention has been described by various embodiments, it will be understood that different modifications and changes may be made without departing from the scope of the invention which is to be defined only by the appended claims.

What is claimed is:

1. A method for demultiplexing light of a plurality of wavelengths in an input beam by means of a filter having a characteristic property that the filter passes incident light of wavelengths within a characteristic wavelength band and reflect incident light of wavelengths outside said first characteristic wavelength band, said plurality of wavelengths including at least three wavelengths, wherein said characteristic wavelength band varies with the angle of incidence of said incident light to the normal direction to the filter, said method comprising:

(a) directing and collimating said input beam towards a filter with said characteristic property at a first incident angle so that light of one of the at least three wavelengths is reflected and light of another of the at least three wavelengths is passed by the filter; and (b) directing and collimating said light substantially reflected or passed by the filter towards the filter at a second incident angle different from the first incident angle, the first and second incident angles being such that the selective passage and reflection of light of different wavelengths by the filter separates the input beam into three output beams, each output beam containing light of one of the at least three wavelengths.

2. The method of claim 1, further comprising the step of receiving light of different wavelengths that has passed through the filter in prior directing and collimating steps in different output optical channels.

3. The method of claim 1, said light of the plurality of wavelengths including light of one or more additional wavelengths in addition to light of the at least three wavelengths, said light of additional wavelengths being reflected or passed by the filter during steps (a), (b), said method further comprising a step (b') after step (b), said step (b') including directing and collimating said light of additional wavelengths substantially reflected by or passed through the filter during prior steps towards said filter or a different filter having said characteristic property so that light in one of said additional wavelengths substantially passes through or is reflected by such filter separately from the light of the at least three wavelengths.

4. The method of claim 3, further comprising a step (b") after step (b') of repeatedly directing and collimating light substantially reflected or is passed by one or more filters in a prior step or steps towards one or more filters having said characteristic property until light in all of said plurality of wavelengths substantially passes through or is reflected by one or more filters.

5. The method of claim 4, wherein light directed towards the same filter in steps (a), (b), (b') and (b") are directed towards the same location or different locations of the same filter.

6. The method of claim 4, said steps (a), (b), (b') and (b") all direct light towards the same filter from the same first side of said filter, and step (c) receives light from the side of the filter opposite to the first side.

7. The method of claim 1, wherein light directed towards the same filter in steps (a), (b), are directed towards the same location or different locations of the same filter.

8. The method of claim 1, wherein in steps (a) and/or (b), light of one or more wavelengths of said plurality of wavelengths in the beam pass through said filter in addition to said first and/or second wavelength.

9. A method for multiplexing light of a plurality of wavelengths in different light beams into one output optical channel by means of a filter having a characteristic property that the filter passes incident light of wavelengths within a characteristic wavelength band and reflect incident light of other wavelengths, wherein said characteristic wavelength band varies with the angle of incidence of said incident light to the normal direction to the filter, said method comprising:

(a) directing and collimating a light beam containing light of one of said plurality of wavelengths towards a location of a first filter with said characteristic property from one side of the first filter so that light of said one wavelength passes through the first filter at an angle to the first filter;

(b) directing and collimating a light beam containing light of at least one additional wavelength of said plurality of wavelengths towards the location of the first filter from the side of the first filter opposite to said one side at substantially said angle to the first filter so that light of at least one additional wavelength is reflected by the first filter at said location to emerge as one beam with or in proximity to light of said one wavelength that has passed through the first filter; and (c) collecting light of said one wavelength and said at least one additional wavelength into an output optical channel to form a collected beam.

10. The method of claim 9, further comprising:

(d) directing and collimating the collected light beam towards one side of the first filter or of a second filter with said characteristic property at a location of the first or the second filter; and (e) directing and collimating an additional light beam of at least one additional wavelength of said plurality of wavelengths towards said location towards the side of such filter opposite to said one side of step (d) so that one of the collected light and additional light beams is reflected and the remaining beam passes through the first or the second filter at said location to emerge as one beam or two contiguous beams; and (f) collecting the emerging one beam or two contiguous beams to form a collected beam.

11. The method of claim 10, further comprising repeating steps (d), (e) and (f) until light of said plurality of wavelengths in different light beams have been multiplexed into one collected beam.

12. The method of claim 10, wherein steps (a), (b), (d) and (e) direct light towards the same location or different locations of the same filter.

13. The method of claim 10, said steps (a), (b), (d) and (e) all direct light towards the same filter from the same side of said filter.

14. The method of claim 9, wherein light directed towards the same filter in steps (a), (b) are directed towards the same location or different locations of the same filter.

15. The method of claim 9, wherein in steps (a) and/or (b), light of one or more wavelengths of said plurality of wavelengths in the beam pass through said filter in addition to said one wavelength and said at least one additional wavelength.

16. An apparatus for demultiplexing light of a plurality of wavelengths including at least three wavelengths in an input beam, said apparatus comprising:

a filter having a characteristic property that the filter passes incident light of wavelengths within a characteristic wavelength band and reflect incident light of wavelengths outside said first characteristic wavelength band, wherein said characteristic wavelength band varies with the angle of incidence of said incident light to the normal direction to the filter;

a first optical channel directing and collimating said input beam towards the filter at a first incident angle so that light of one of the at least three wavelengths is reflected and light of another of the at least three wavelengths is passed by the filter;

a second optical channel directing and collimating said light substantially reflected or passed by the filter towards the filter at a second incident angle different from the first incident angle, the first and second incident angles being such that the selective passage and reflection of light of different wavelengths by the filter separates the input beam into three output beams, each output beam containing light of one of the at least three wavelengths.

17. The apparatus of claim 16, further comprising a plurality of output optical channels receiving light of different wavelengths that has passed through the filter.

18. The apparatus of claim 16, said light of the plurality of wavelengths including light of one or more additional wavelengths in addition to light of the at least three wavelengths, said light of said one or more additional wavelengths being reflected or passed by the filter upon direction and collimation of light towards the filter by the first and second optical channels, said apparatus further comprising a third optical channel directing and collimating the light of said one or more additional wavelengths that is substantially reflected by or passed through the filter towards said filter or a different filter having said characteristic property so that light in one of said additional wavelengths substantially passes through or is reflected by such filter separately from the light of the at least three wavelengths.

19. The apparatus of claim 18, further comprising one or more additional optical channels for repeatedly directing and collimating light that is substantially reflected or is passed by one or more filters towards one or more filters having said characteristic property until light in all of said plurality of wavelengths substantially passes through or is reflected by one or more filters.

20. The apparatus of claim 19, wherein the first, second, third and additional optical channels direct light towards the same location or different locations of the same filter.

21. The apparatus of claim 19, wherein the first, second, third and additional optical channels all direct light towards the same filter from the same first side of said filter, said apparatus further comprising a plurality of output optical channels, each of said output optical channels receiving light of one of said plurality of wavelengths from the side of the filter opposite to the first side.

22. The apparatus of claim 16, wherein the first and second optical channels direct light towards the same location or different locations of the same filter.

23. The apparatus of claim 16, wherein the filter is a bandpass or edge interference filter.

24. An apparatus for multiplexing light of a plurality of wavelengths in different light beams into one output optical channel, said apparatus comprising:

a first filter having a characteristic property that the first filter passes incident light of wavelengths within a characteristic wavelength band and reflects incident light of other wavelengths, wherein said characteristic wavelength band varies with the angle of incidence of said incident light to the normal direction to the first filter;

a first connecting optical channel directing and collimating a light beam containing light of one of said plurality of wavelengths towards a first location of the first filter from one side of the first filter so that light of said one wavelength passes through the first filter at an angle to the first filter;

a second connecting optical channel directing and collimating a light beam containing light of at least one additional wavelength of said plurality of wavelengths towards the first location of the first filter from the side of the first filter opposite to said one side at substantially said angle to the first filter so that light of at least one additional wavelength is reflected by the first filter at said first location to emerge as one beam with or in proximity to light of said one wavelength that has passed through the first filter; and a first output optical channel collecting light of said one wavelength and said at least one additional wavelength to form a collected beam.

25. The apparatus of claim 24, said first output optical channel directing and collimating the collected light beam towards one side of the first filter or of a second filter with said characteristic property at a second location of the first or the second filter, said apparatus further comprising:

a third optical channel directing and collimating an additional light beam of light of at least one additional wavelength of said plurality of wavelengths towards said second location towards the side of the first or the second filter opposite to the first output optical channel so that one of the collected light and additional light beams is reflected and the remaining beam passes through the first or the second filter at said second location to emerge as one beam or two contiguous beams; and a second output optical channel collecting the emerging one beam or two contiguous beams from the third optical channel to form a collected beam.

26. The apparatus of claim 24, further comprising:

one or more additional output optical channels for repeatedly directing and collimating a collected light beam from an output optical channel towards one side of the first filter or of a second filter with said characteristic property at a location of the first or the second filter;

one or more additional connecting optical channels directing and collimating an additional light beam of light of at least one additional wavelength of said plurality of wavelengths towards said second location towards the side of the first or the second filter opposite to the one or more additional output optical channels so that light of said plurality of wavelengths in different light beams are multiplexed into one collected beam.

27. The apparatus of claim 26, wherein the connecting optical channels direct light towards the same location or different locations of the same filter.

28. The apparatus of claim 26, wherein the connecting optical channels direct light from the same side of said same filter.

29. The apparatus of claim 24, wherein the connecting optical channels direct light towards the same location or different locations of the same filter.

30. The apparatus of claim 24, wherein the filter is a bandpass or edge interference filter.

* * * * *